United States Patent [19]

Meyer

[11] Patent Number: 6,019,204

[45] Date of Patent: Feb. 1, 2000

[54] HYDRAULICALLY OPERATED CLUTCH RELEASE MECHANISM FOR A MOTOR VEHICLE

[75] Inventor: Gerhard Meyer, Lehrberg, Germany

[73] Assignee: LuK Lamellen und Kupplungsbau GmbH, Bühl, Germany

[21] Appl. No.: 09/251,285

[22] Filed: Feb. 16, 1999

[30] Foreign Application Priority Data

Feb. 27, 1998 [DE] Germany .......................... 198 08 315

[51] Int. Cl.[7] .................................................. F16D 25/08
[52] U.S. Cl. .................................. 192/85 CA; 192/91 A
[58] Field of Search ............... 192/85 CA, 91 A

[56] References Cited

U.S. PATENT DOCUMENTS

| | | |
|---|---|---|
| 4,609,087 | 9/1986 | Shirley . |
| 4,687,084 | 8/1987 | Leigh-Monstevens . |
| 4,779,713 | 10/1988 | Tomala et al. .................. 192/85 CA X |
| 5,113,657 | 5/1992 | Compton et al. . |
| 5,577,585 | 11/1996 | Corral .................................. 192/91 A |

FOREIGN PATENT DOCUMENTS

| | | |
|---|---|---|
| 28 15 971 A1 | 10/1979 | Germany . |
| 296 09 288 U1 | 9/1996 | Germany . |
| 693 03 471 T2 | 10/1996 | Germany . |
| 195 21 281 A1 | 12/1996 | Germany . |
| 195 22 477 A1 | 1/1997 | Germany . |
| 195 23 011 A1 | 1/1997 | Germany . |
| 196 26 016 A1 | 1/1997 | Germany . |
| 2 121 504 A | 12/1983 | United Kingdom . |
| WO 97/30296 A2 | 8/1997 | WIPO . |

*Primary Examiner*—Richard M. Lorence
*Attorney, Agent, or Firm*—Henry M. Feiereisen

[57] ABSTRACT

A hydraulically operated release mechanism for a friction clutch assembly of motor vehicles, includes a slave cylinder adapted for positioning in a clutch housing and having a pressure housing in concentric surrounding relation to a driveshaft and secured to a gearbox casing. Hydraulic fluid is supplied to a pressure compartment of the slave cylinder via a pressure conduit which is connected in one piece with the pressure housing and bridges a radial distance between the pressure housing and the clutch housing. The pressure conduit has a free end for attachment of an adapter inside the clutch housing in proximity of an opening of the clutch housing, with a fitting insertable through the opening for attachment to the adapter, after assembly of the slave cylinder.

18 Claims, 5 Drawing Sheets

HYDRAULICALLY OPERATED CLUTCH RELEASE MECHANISM FOR A MOTOR VEHICLE

CROSS-REFERENCES TO RELATED APPLICATIONS

This application claims the priority of German Patent Application Serial No. 198 08 315.7, filed Feb. 27, 1998, the subject matter of which is incorporated herein by reference.

BACKGROUND OF THE INVENTION

The present invention relates, in general, to a hydraulically operated release mechanism for a friction clutch assembly of motor vehicles, and more particularly to a hydraulic clutch release mechanism of a type having a slave cylinder (piston-cylinder unit) adapted for positioning in a clutch housing and having a pressure housing in concentric surrounding relation to a driveshaft and secured to a gearbox casing.

Activation of such a hydraulic clutch release mechanism is typically realized by a master cylinder which is manually actuated for supply of hydraulic fluid to the slave cylinder via a hydraulic pipe extending between the master cylinder and the slave cylinder. A simplified connection of the hydraulic pipe is realized by providing the clutch release mechanism in single-piece configuration with a pressure conduit which bridges a radial distance between the slave cylinder and the clutch housing, and has a free end provided with an adapter to which the hydraulic pipe is also connected.

A hydraulic clutch release mechanism of this type is described in U.S. Pat. No. 4,609,087, issued Sep. 2, 1986. The housing of this release mechanism is formed in one piece with the pressure conduit in the area of the flanged attachment zone of the gearbox casing, whereby the pressure conduit includes a passageway for hydraulic fluid and a separate vent passageway. The pressure conduit is so configured that the adapter as well as the ventilation project out through an opening of the clutch housing in assembled state, whereby the pressure conduit is received in a particular conduit guide of the clutch housing. For this purpose, the clutch housing is provided on one end with a U-shaped, radially inwardly directed channel which surrounds the end zone of the pressure conduit. Provided for sealing purposes is an elastic sealing element which is positioned in the clutch housing at a radial distance to the adapter and conforms to the U-shaped configuration of the channel to realize a sealing action. In view of its great length, the sealing element assumes also a support of the pressure conduit in the clutch housing. As the sealing element is disposed radially inwardly of the adapter at a distance thereto, contaminants may migrate into the space located radially outwardly of the sealing element between the pressure conduit and the wall surface of the clutch housing. Moreover, installation of the sealing element is complicated as a consequence of the dual function thereof because the sealing element must be pushed over the radially expanded adapter of the pressure conduit while increased care must be taken when axial joining the clutch housing and the gearbox casing. A further drawback of this conventional hydraulic clutch release mechanism is the need for a particularly designed clutch housing to suit the pressure conduit.

SUMMARY OF THE INVENTION

It is thus an object of the present invention to provide an improved hydraulic clutch release mechanism, obviating the afore-stated drawbacks.

In particular, it is an object of the present invention to provide an improved hydraulic clutch release mechanism which includes a pressure conduit with an adapter that enables a simplified and cost-efficient attachment of a fitting as well as of the pertaining connection pipe.

These objects, and others which will become apparent hereinafter, are attained in accordance with the present invention by providing a slave cylinder adapted for positioning in a clutch housing and having a pressure housing in concentric surrounding relation to a driveshaft and secured to a gearbox casing, and by providing a pressure conduit which is connected in one piece with the pressure housing and bridges a radial distance between the pressure housing and the clutch housing, with an adapter mounted to the free end of the conduit inside the clutch housing in proximity of an opening of the clutch housing, and with a fitting insertable through the opening for attachment to the adapter after assembly of the pressure housing.

In accordance with the present invention, the pressure conduit is extended to a location near the opening of the clutch housing, so that the fitting can be attached to the adapter through the opening, after assembly of the pressure conduit, without adversely affecting the external peripheral configuration of the clutch housing as the position of the adapter is not fixed. Moreover, the pressure conduit can now be made sufficiently rigid so that the need for a separate support inside the clutch housing is eliminated, although circumstances may arise that make it advisable to provide a support of the fitting or the pressure conduit upon the clutch housing. As the adapter is disposed in proximity of the opening of the clutch housing, the dimensions of the opening may be small in correspondence to the dimensions of the adapter, thereby facilitating a sealing of the opening.

According to another feature of the present invention, the fitting is secured to the adapter by a plug-type connection, whereby an additional safety mechanism ensures an inadvertent detachment of the fitting. The plug-type connection may be formed by an inner stub-like part projecting out from the fitting in an axial direction, and a socket formed on a confronting end of the adapter and destined for engagement by the inner part. Thus, the axial part of the fitting forms an inner part while the adapter forms an outer part. However, it is certainly possible to provide a reverse configuration, with the adapter representing the inner part and the fitting representing the outer part. Moreover, regardless of the their configuration, the joined components forming the plug-type connection can be suitably sealed.

According to another feature of the present invention, the inner part of the fitting may be formed with a serrated outer surface area, to thereby realize a locked engagement, with the outer surface area having a diameter which exceeds the inside diameter of the socket of the adapter so that the fitting is being pressed by force into the socket of the adapter. Such an interference fit between the adapter and the fitting realizes at the same time an effective sealing of the plug-type connection, without requiring separate sealing elements. Alternatively, it is also within the scope of the present invention to provide a tubular intermediate piece having opposite ends formed with serrated outer surface areas, with one end destined to be pressed into a receiving bore of the master cylinder and with the other end destined to be pressed in a receiving bore of the fitting.

In order to establish a precise positional relationship between the fitting and the adapter or pressure conduit, the inner part of the plug-type connection may be formed with a centering pin which fits in a complementary recess of the socket. The centering part thus serves as a safeguard against a torque upon threaded engagement of the vent screw and general assembly of the fitting, so that the need for a separate support or anti-rotation system is eliminated.

In order to realize a vibration-free attachment of the fitting to the pressure conduit, the fitting may be secured to the adapter by a wedged connection, whereby one of the elements, fitting or adapter, has an outwardly projecting inner part and the other one of the elements has a socket formed with wedge-shaped inner surfaces for receiving the inner part. Such a wedged connection realizes not only a rigid, vibration-free attachment of the fitting but also results in a simplified installation because the conical components enable a certain centering action.

According to another feature of the present invention, the fitting may also be secured to the adapter by a screwed connection. Preferably, the fitting is formed with an external thread which can be threaded into the socket of the adapter.

Other examples for a plug-type connection include a bayonet coupling for positioning the fitting in place with respect to the adapter.

Preferably, the fitting and the adapter may be additionally secured to one another by a safety mechanism in the form of a snap-on connection. This is accomplished, for example, by providing one of the elements, fitting or adapter, with a retaining lug for engagement in a recess or an undercut formed on the other one of the elements in assembled state. This safeguard may be further supported or enhanced by captivating in the socket or outer part a resilient clip which radially outwardly expands during attachment of the other element and locks in a complementary recess, in particular a ring groove, in the outer surface area of the inserted element when the elements are correctly positioned. Instead of using a clip, it is certainly possible to utilize a spring-loaded bolt or a spring-loaded pin as safety member.

Preferably, the fitting may be so configured as to allow attachment of a connection pipe at a right angle to the adapter depending on the installation of the pressure conduit. However, any other angled attachment of the connection pipe is certainly within the scope of the present invention. Such a configuration results in a reduction of the radial structural space upon attachment of the connection pipe to the fitting which forms a prolongation of the pressure conduit.

According to yet another feature of the present invention, the fitting further accommodates a vent valve by which air trapped in the release mechanism can, optionally, be evacuated. Suitably, the vent valve may be disposed at a right angle to the longitudinal fitting axis or aligned longitudinally in direction of the fitting.

Advantageously, the fitting has integrated therein at least one auxiliary element such as an admission pressure valve, a peak torque limiter or an orifice plates or other damping device, to compensate pressure fluctuations encountered in the hydraulic system. Such pressure fluctuations may occur, for example, when axial vibrations of the crankshaft propagate via the friction clutch and the release mechanism to the slave cylinder and ultimately to the entire hydraulic release system, and manifest themselves in an uncomfortable "tingling" of the clutch pedal. Suitably, the auxiliary element is connected to the fluid conduction in the fitting. This type of structural combination simplifies the assembly and results in a reduction of the circumferential dimensions of the components.

According to another feature of the present invention, the fitting is provided with an elastic protective hood which effectively prevents a penetration of contaminants into the clutch housing. The protective hood is so configured and arranged as to conform to the clutch housing opening which is provided for installation of the fitting.

Preferably, the fitting is made of plastic material, in particular polymers, e.g. polyphthalamide (PPA) or polyphenyl sulfides (PPS), to enable large scale production in a cost-efficient manner. A suitable material for the slave cylinder includes in particular aluminum alloys. Alternatively, the slave cylinder may also be made of a polymeric plastic material for realizing with the fitting a matching material pair.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
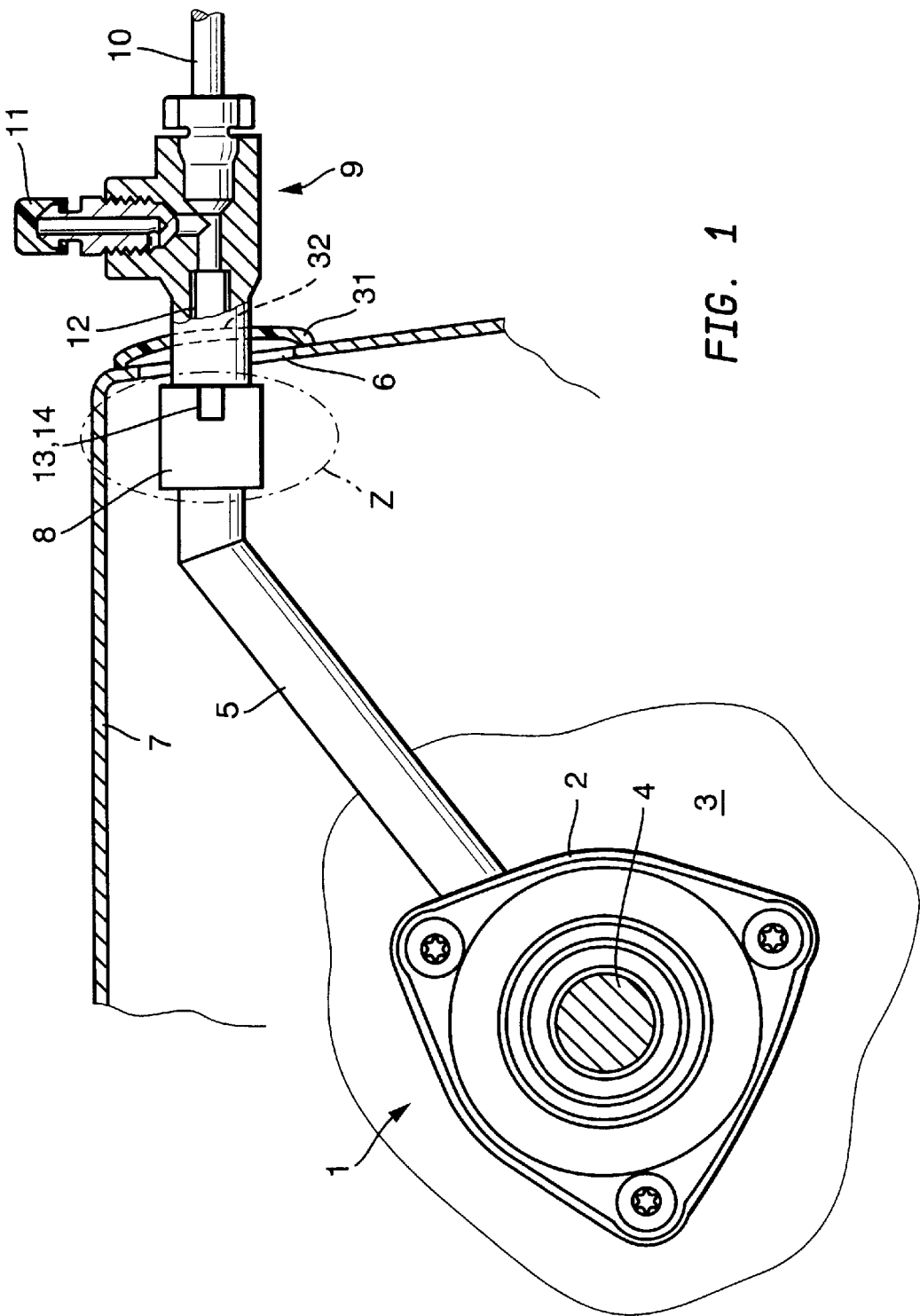
FIG. 1 is a schematic, partially sectional view of a clutch release mechanism according to the present invention.

Throughout all the Figures, same or corresponding elements are generally indicated by same reference numerals.

Figure 1A:
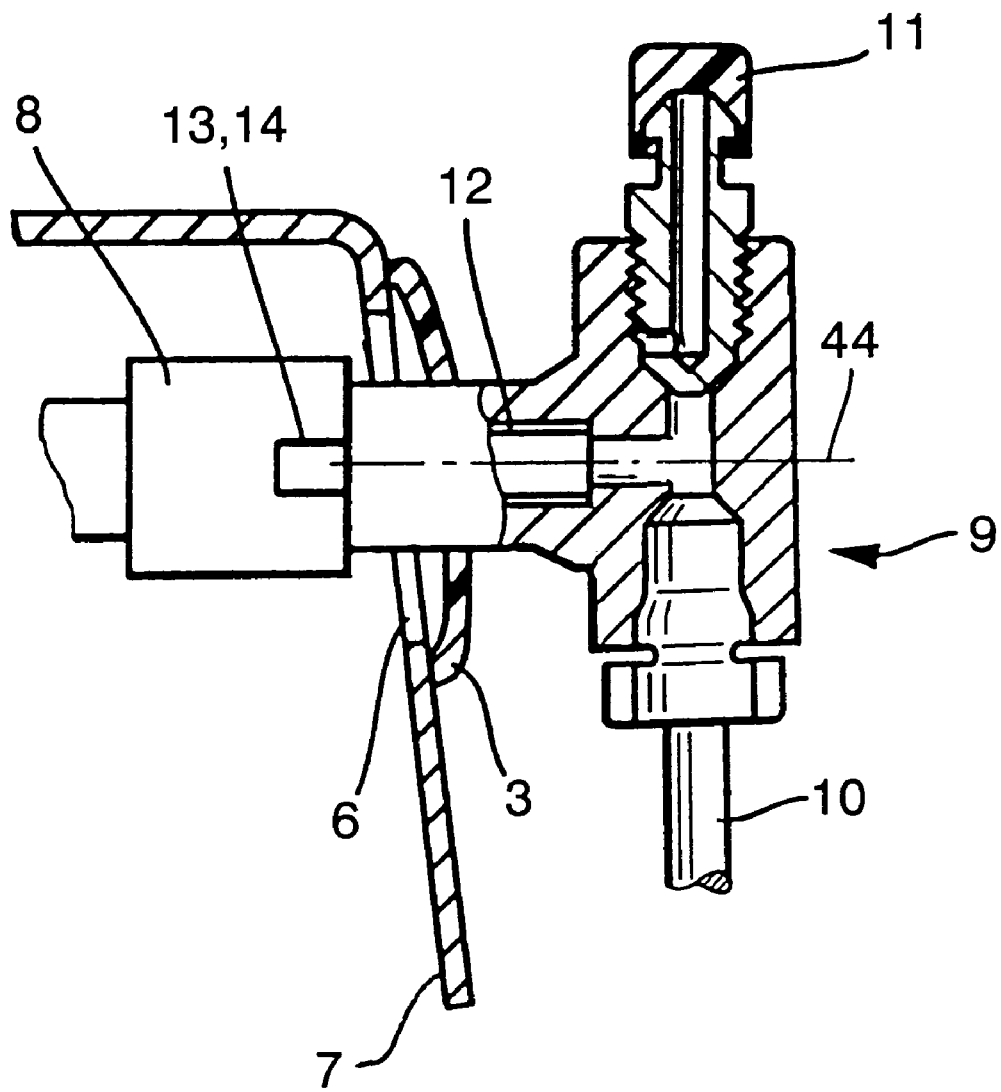
FIG. 1a is a schematic, partially sectional cutaway view of the clutch release mechanism according to the present invention, showing a modified fitting for attachment of a connection pipe.

Turning now to the drawing, and in particular to FIG. 1, there is shown a schematic, partially sectional view of a hydraulic clutch release mechanism according to the present invention, including a slave cylinder 1 having a pressure housing 2 screwed onto a gearbox casing 3. The slave cylinder 1 concentrically surrounds a driveshaft 4 and is formed in one piece with a pressure conduit 5 projecting radially out of the pressure housing 2 for supply of hydraulic fluid for actuation of a friction clutch. The pressure conduit 5 is extended into close proximity of an opening 6 in a clutch housing 7 which surrounds the friction clutch and the slave cylinder 1. The pressure conduit 5 is of rigid configuration, thereby eliminating the need for a separate support upon the clutch housing 7 and thus facilitating the overall assembly. Attached to the free end of the pressure conduit 5 is an adapter 8 for attachment of a fitting 9. The fitting 9 is designed as a multi-purpose element and includes a simplified terminal for attachment of a connection pipe 10 via which hydraulic fluid is conducted from a master cylinder (not shown) to the slave cylinder 1. As shown in FIG. 1a, the connection pipe 10 may also be attached to the fitting 9 at a right angle to the longitudinal axis 44 of the fitting 9 and adapter 8. In addition, the fitting 9 is provided with a vent valve 11 for evacuating air trapped in the slave cylinder 1, and may have integrated therein an auxiliary element, e.g. an admission pressure valve, an orifice plate or a peak torque limiter or other damping device. It will be appreciated by persons skilled in the art that the fitting 9 may also be equipped with more than one auxiliary element 12.

Projecting out from its end face confronting the adapter 8, the fitting 9 is formed with a centering pin 13 for engagement in a complementary recess 14 of the adapter 8 to thereby realize a correct positional orientation of the fitting 9 with respect to the pressure conduit 5. A sealing element 31 is received in a radial groove 32 of the fitting 9 and effectively seals the opening 6 in the clutch housing 7 from the fitting 9. In this manner, the sealing element 31 is supported by the clutch housing 7, when being installed, while covering the opening 6.

Turning now to FIGS. 2 to 9, there are shown, on an enlarged scale, cutaway views of a detail, marked Z, in FIG. 1, to illustrate various embodiments of a connection between the fitting 9 and the adapter 8. In describing the FIGS. 2 to 9, like parts will be identified by corresponding reference numerals differentiated by the respective lower case characters "a" to "h", where appropriate.

Figure 2:
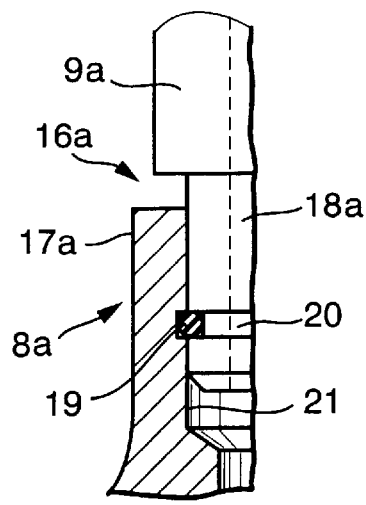
FIG. 2 is a fragmentary, partially sectional view, on an enlarged scale, of a plug-type connection between the slave cylinder and a fitting.

FIG. 2 shows a fitting 9a which forms in conjunction with the adapter 8a a plug-type connection, generally designated by reference numeral 16a. The fitting 9a has formed thereon in one piece an outwardly projecting inner part 18a which forms a stub for engagement in a socket 17a of the adapter 8a. The plug-type connection is effectively sealed by a sealing ring 19 which is received in a radial groove 20 of the inner part 18a and bears upon the inside wall surface 20 of the socket 17a.

Figure 3:
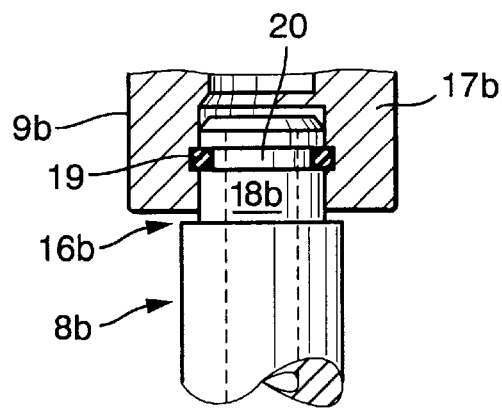
FIG. 3 is a fragmentary, partially sectional view, on an enlarged scale, of a modified plug-type connection between the slave cylinder and a fitting.

FIG. 3 shows between the fitting 9b and the adapter 8b a plug-type connection 16b which is merely a reverse configuration of the plug-type connection 16a, i.e. the adapter 8b is formed in one piece with an outwardly projecting inner part 18b while the fitting 9b forms the socket 17b for engagement of the inner part 18b.

Figure 4:
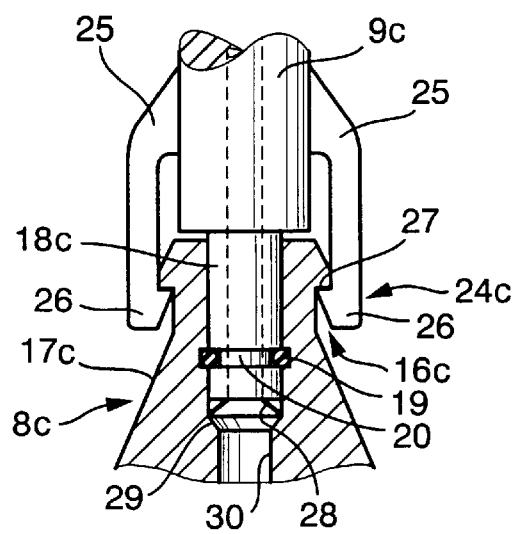
FIG. 4 is a fragmentary, partially sectional view, on an enlarged scale, of a safety mechanism in the form of a snap-on connection between the slave cylinder and the fitting.

FIG. 4 shows between the adapter 8c and the fitting 9c a plug-type connection, generally designated by reference numeral 16c and formed by an outwardly projecting inner part 18c which projects out in one piece from the fitting 9c and is received in a socket 17c of the adapter 8c. The plug-type connection 16c is complemented by a safety mechanism in the form of a snap-on connection, generally designated by reference numeral 24c and including two retention elements 25 jutting out from opposite sides of the fitting 9c and extending axially toward the adapter 8c. The retention elements 25 terminate in retaining lugs 26 which extend radially inwardly and are capable of hooking behind complementary undercuts 27 formed on the fitting-confronting end face of the adapter 8c. In order to realize a biased, i.e. force-fitting arrangement of the fitting 9c in the adapter 8c, a spring element 28 is supported on the end face of the inner part 18. The spring element 28 is preferably a disk spring 28 and rests on a shoulder 29 formed by a counterbore of the bore 30 for conducting hydraulic fluid through the adapter 8c.

Figure 5:
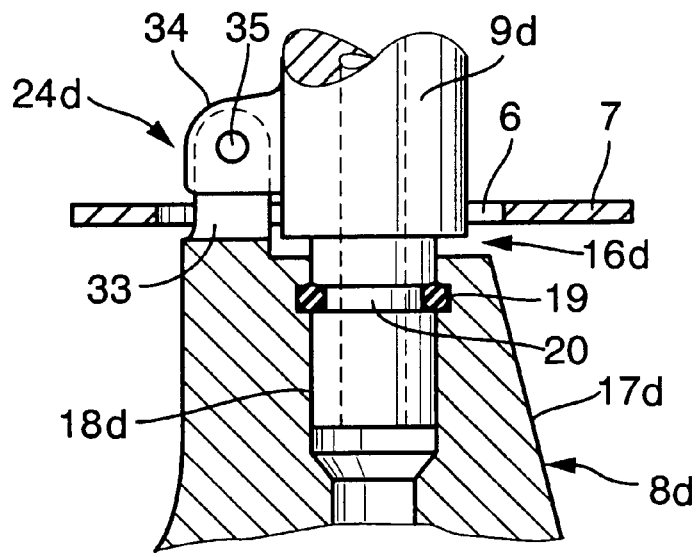
FIG. 5 is a fragmentary, partially sectional view, on an enlarged scale, of a modified safety mechanism.

In FIG. 5, the adapter 8d is coupled to the fitting 9d via the plug-type connection 16d which substantially corresponds to the plug-type connection 16c in FIG. 4, i.e. the fitting 9d is formed with an outwardly projecting inner part 18d which projects out in one piece from the fitting 9d and is received in a socket 17d of the adapter 8d, with the plug-type connection 16d being secured by a modified safety mechanism 28d. In accordance with the embodiment of FIG. 5, the adapter 8d is formed on its end face confronting the fitting 9d with a protrusion 33 which is received in a receptacle 35 projecting radially out of the fitting 9d. A bolt 35 extends through aligned bores of the protrusion 33 and the receptacle 35 to pin these components together. Suitably, the protrusion 33 has such a longitudinal extension as to project through the opening 6 of the clutch housing 7 to allow assembly of the bolt 35 outside the clutch housing 7.

Figure 6:
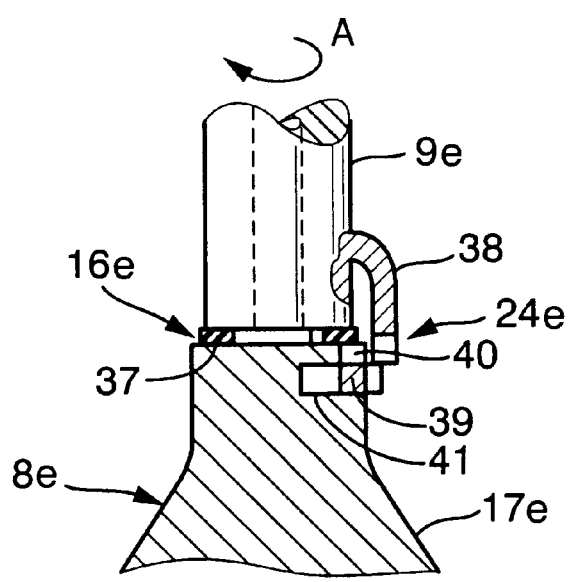
FIG. 6 is a fragmentary, partially sectional view, on an enlarged scale, of another variation of a plug-type connection between the slave cylinder and a fitting, secured by a bayonet coupling.

In FIG. 6, the adapter 8e and the fitting 9e are connected to one another by a plug-type connection 16e in combination with a bayonet coupling, generally designated by reference numeral 24e. This is realized by providing the fitting 9e with an axially directed retention element 38 which terminates in direction to the adapter 8e in a radially inwardly directed guide pin 39. The configuration of the guide pin 39 conforms to the geometry of an axial groove 40 and a radial groove 41 which are formed in the adapter 8e. The attachment of the fitting 9e is realized by initially introducing the guide pin 39 into the axial groove 40. After reaching the radial groove 41, the fitting 9e is turned in the direction of arrow A. As the radial groove 41 has an oblique configuration, the fitting 9e shifts simultaneously with the rotation in an axial direction to thereby effect a compression of a damping element 37 sandwiched between confronting end faces of the adapter 8e and the fitting 9e. The provision of the damping element 37 realizes a desired prestress of these components to enhance the effectiveness of the bayonet coupling 24e.

Figure 7:
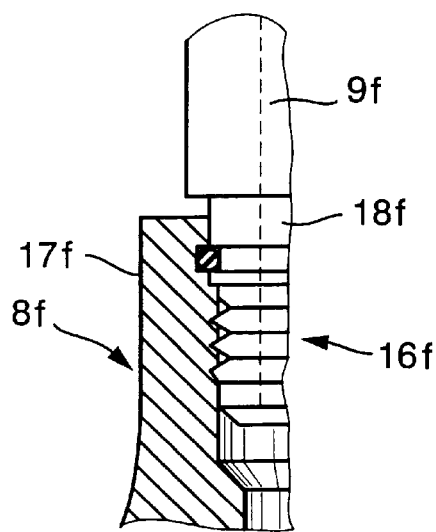
FIG. 7 is a fragmentary, partially sectional view, on an enlarged scale, of a screwed connection for attachment of the fitting to the slave cylinder.

In FIG. 7, the fitting 9f is linked to the adapter 8f via a screwed connection, generally designated by reference numeral 16f and realized by providing the inner part 18f of the fitting 9f with an external thread which meshes with an internal thread of the socket 17f.

Figure 8:
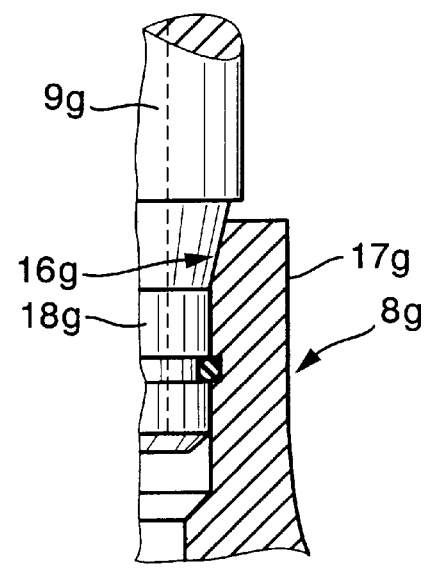
FIG. 8 is a fragmentary, partially sectional view, on an enlarged scale, of still another variation of a plug-type connection between the slave cylinder and a fitting, secured by a wedged connection.

A further variation for securing the fitting 9f to the adapter 8f is shown in FIG. 8 and is realized via a wedged connection, generally designated by reference numeral 16g and realized by providing the fitting 9g with an inner part 18f having an outer surface area in the shape of a cone or truncated cone. The adapter 8f is formed with a socket 17g which has a conical inside wall surface that complements the cone-shaped outer surface area of the inner part 18f of the fitting 9g, thereby providing a wedge action when inserting the fitting 9g into the adapter 8g. The provision of the wedged connection 16g effects a coupling of the fitting 9g in the adapter 8g, which is secured against vibrations.

Figure 9:
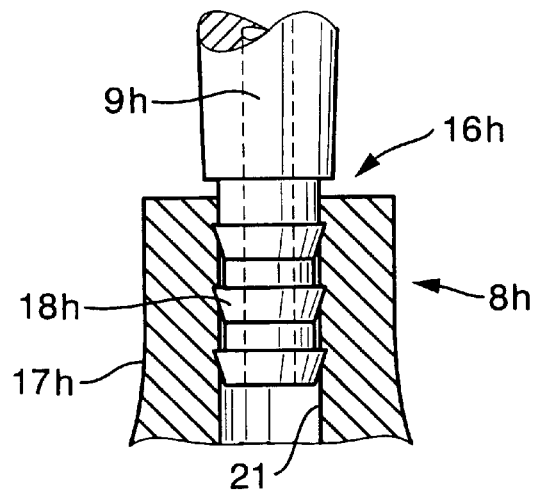
FIG. 9 is a fragmentary, partially sectional view, on an enlarged scale, of still another variation of a plug-type connection between the slave cylinder and a fitting.

FIG. 9 shows another variation of a plug-type connection 16h for coupling the fitting 9h to the adapter 8h. The fitting 9h is preferably made of plastic material, e.g. polyphthalamide (PPA) or polyphenyl sulfides (PPS), and has an inner part 18h which has a serrated outer surface area, whereby the outer perimeter of the serrated outer surface area has dimensions which exceed the diameter of the bore wall 21 of the socket 17h. Upon forced insertion of the inner part 18h into the socket 17h, the serrated outer surface area of the inner part 18h is deformed and is wedged into the bore wall 21 to thereby effect a permanent, secure and sealed attachment and mounting of the fitting 9h in the adapter 8h. This type of plug-type connection 16h is also labeled as locked connection.

While the invention has been illustrated and described as embodied in a hydraulically operated clutch release mechanism for a motor vehicle, it is not intended to be limited to the details shown since various modifications and structural changes may be made without departing in any way from the spirit of the present invention.

What is claimed as new and desired to be protected by Letters Patent is set forth in the appended claims:

1. A hydraulically operated release mechanism for a friction clutch assembly of motor vehicles, comprising:
    a slave cylinder adapted for positioning in a clutch housing and having a pressure housing in concentric surrounding relation to a driveshaft and secured to a gearbox casing;
    hydraulic means for supply of hydraulic fluid to a pressure compartment of the slave cylinder, said hydraulic means including a pressure conduit connected in one piece with the pressure housing and bridging a radial distance between the pressure housing and the clutch housing, said pressure conduit having a free end;
    an adapter mounted to the free end of the pressure conduit inside the clutch housing in proximity of an opening of the clutch housing; and
    a fitting insertable through the opening after assembly of the pressure housing, for attachment to the adapter.

2. The release mechanism of claim 1 wherein the fitting is secured to the adapter by a plug-type connection, and further comprising a safety mechanism for positioning the fitting in place.

3. The release mechanism of claim 2 wherein the plug-type connection is realized by an inner part forming a pipe and projecting out from the fitting in an axial direction, and a socket formed on a confronting end of the adapter and destined for engagement by the inner part.

4. The release mechanism of claim 2 wherein the plug-type connection is realized by an inner part projecting out from the adapter in an axial direction for engagement in a confronting socket of the fitting.

5. The release mechanism of claim 3 wherein the inner part of the fitting is formed with a serrated outer surface area, said fitting being capable of being pressed by force into the socket of the adapter to realize a locked engagement, with the elastically deformable outer surface area of the inner part being wedged upon an inner wall surface of the socket.

6. The release mechanism of claim 1 wherein the fitting is secured to the adapter by a wedged connection, with one of the elements selected from the group consisting of the fitting and the adapter having an outwardly projecting inner part and the other one of the elements having a socket formed with wedge-shaped inner surfaces for receiving the inner part.

7. The release mechanism of claim 1 wherein the fitting is formed with a centering pin for engagement in a complementary recess of the adapter when the fitting is attached to the adapter.

8. The release mechanism of claim 1 wherein the fitting is secured to the adapter by a plug-type connection, and further comprising a safety mechanism in the form of a bayonet coupling for positioning the fitting in place with respect to the adapter.

9. The release mechanism of claim 1 wherein the fitting is secured to the adapter by a screwed connection.

10. The release mechanism of claim 2 wherein the safety mechanism is a snap-on connection between the fitting and the adapter.

11. The release mechanism of claim 10 wherein the fitting includes at least one axially projecting retention element which terminates in a retaining lug for hooking behind an undercut formed on the adapter when the fitting is secured to the adapter.

12. The release mechanism of claim 1, and further comprising a connection pipe attached at a right angle to the adapter when the fitting is installed.

13. The release mechanism of claim 12, and further comprising a vent valve disposed offset to the attachment of the connection pipe to the fitting.

14. The release mechanism of claim 1, and further comprising at least one auxiliary element integrated in the fitting.

15. The release mechanism of claim 14 wherein the auxiliary element is selected from the group consisting of admission pressure valve, orifice plate, and peak torque limiter.

16. The release mechanism of claim 14 wherein the fitting has a radial sealing element for sealing the opening of the clutch housing when the fitting is installed.

17. The release mechanism of claim 1 wherein the fitting is made of polymeric plastic material.

18. The release mechanism of claim 1 wherein the pressure housing together with the pressure conduit and the fitting are made of a polymeric plastic material for realizing matching material pairs of components.

* * * * *